June 8, 1965 C. S. FLYNN 3,188,366
HEATING PROCESS

Filed Jan. 17, 1962 2 Sheets-Sheet 1

INVENTOR.
CHARLES S. FLYNN
BY *Price & Heneveld*
ATTORNEYS

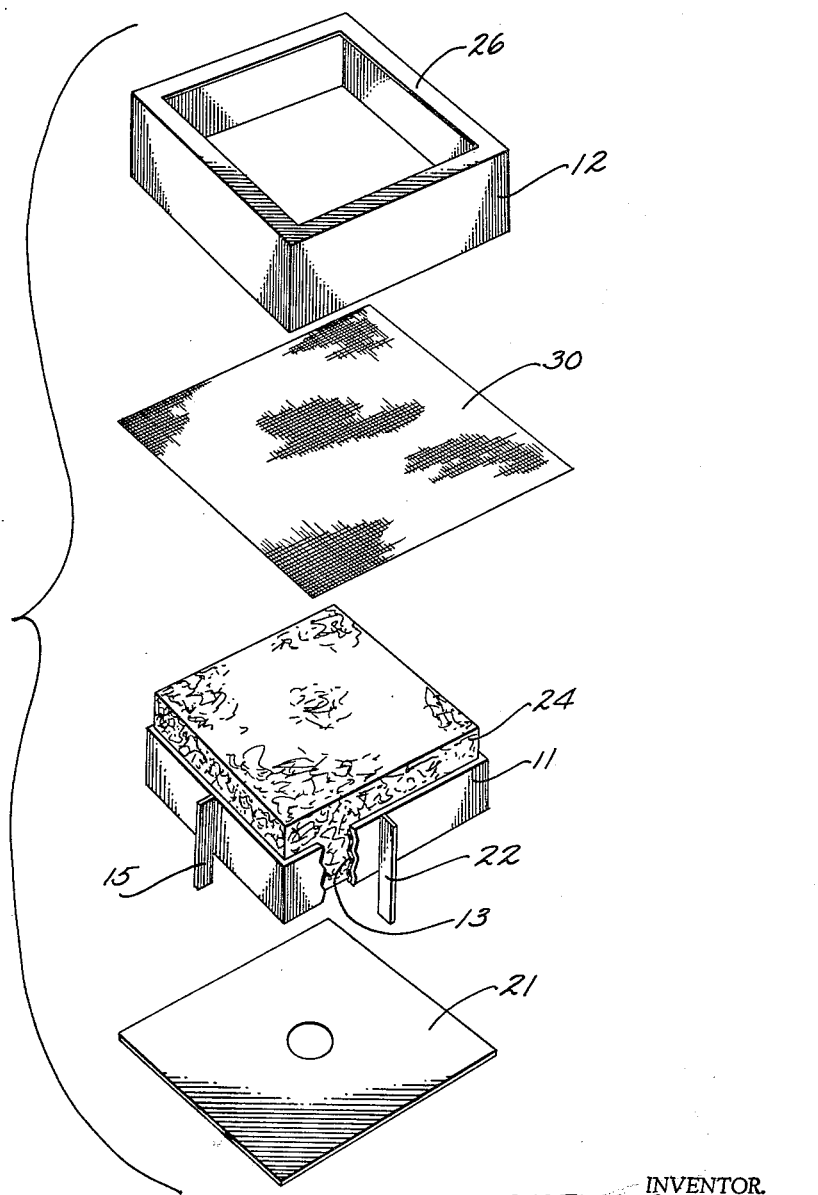

United States Patent Office 3,188,366
Patented June 8, 1965

3,188,366
HEATING PROCESS
Charles S. Flynn, 2991 Sherwood Court, Muskegon, Mich.
Filed Jan. 17, 1962, Ser. No. 166,843
2 Claims. (Cl. 263—52)

This invention relates to heating by combusion of gases, and especially to a method of rapidly heating substances in a protective mantle by the combustion of gases.

In the mass production of articles having a surface which must be subjected to heat, there usually exists today a production "bottleneck" due to the lack of an available, dependable heating technique fast enough to match the output of adjacent production equipment. One example of this is the sealing of film coated, heat sealed packages.

In one situation of which I have knowledge, packages having a polyethylene film coating can be sealed with present equipmnet only at the rate of about forty packages per minute because it take at least one and one-half seconds to "activate" or properly heat-soften the plastic film coating on the flaps of each package as it passes by a heating means. Various attempts have been made by producers of these packages to increase this output, but with little success.

Not only are the conventional methods relatively slow, but there is also a regular, substantial loss of coating film due to oxidation and evaporation during the heating period. Furthermore, when conventional methods are accelerated to get up to forty cartons per minute output, scorching of the backing (e.g. carboard) often occurs. Thus, it is common practice in the packaging field, for example, to coat cartons with a full mil of polyethylene, or other plastic, in order to end up with one-half of activated material after heat sealing. This loss represents hundreds of thousands of dollars with high speed production equipment. In addition, the scrap rate due to the scorched boxes and poor sealing using conventional heating techniques is very substantial. Further, the pressure sealing equipment following the heaters is normally used at only a fraction of its normal capacity due to the "bottleneck" at the film heating step preceding it.

Conventional burners often cause overheating of equipment placed near them in the production arrangement. This is due chiefly to radiation of heat from the hot burner surface. These conventional burners simply cannot obtains an intense local heat without radiating heat all around.

To my knowledge, these same limitations are experienced in other fields besides packaging, e.g., bonding of plastic sheets, impregnation of cloth with fused plastic, case hardening of metals, silver soldering, weld preheating, drying processes and many others.

It is an object of this invention to provide a method of heating capable of increasing the speed of surface heating many times that of methods presently used, and thereby increasing the rate of heat sealing and penetration. This novel method enables the heat softening or "activation" of a surface film of material such as plastic or wax in about 1/10 of a second or less as compared to at least one and one-half seconds or more with prior techniques.

It is another object of this invention to provide a method of heating capable of bringing the surface to the desired temperature rapidly and in a protective atmosphere created with the heating process. Thereby no significant oxidation or other loss of the substance heated occurs. Further, the heat produced is so uniform and closely controllable that scrap due to scorching of the backing material by uneven distribution of heat or excessive oxidation is substantially eliminated, for instance in packaging processes. When this method is used, the film coating, such as polyethylene on a carton, may be initially made to the thickness desired at the finish of the process. In other words, a package with a coating of one-half mil unactivated material will end up with substantially one-half mil activated material when the process is completed. The resulting savings due to production rate increases by a multiple factor, due to elimination of scrap by scorching and poor sealing, and due to the marked decrease in cost of expensive coating materials is extremely significant. Like savings can also be realized in other processes requiring heat.

It is another object of this invention to provide a method of heating wherein the temperature to which the material to be heated is subjected may be accurately controlled while still protecting the material from oxidation from air contact.

It is still another object of this invention to provide a heating method capable of utilizing no open flame of significant thickness and without exposure of the material to infrared heat, if desired, while still providing a rapid process without exposure to air.

These and other object of this invention will be apparent upon studying the following specification in conjunction with the drawings in which:

FIG. 5 is a perspective, exploded view of the burner illustrated in FIGS. 1 and 2.

Figure 1:
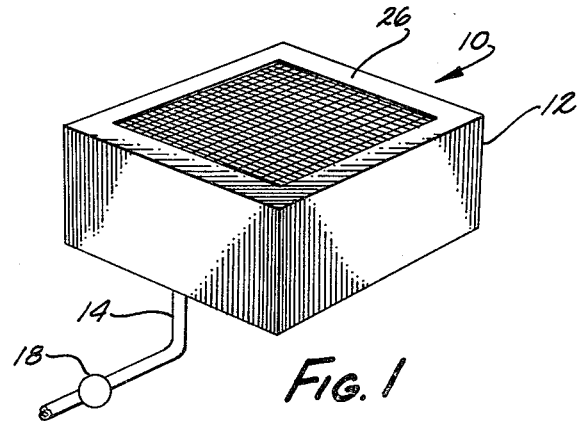
FIG. 1 is a perspective view of one form of burner capable of use with the novel method of this invention.

Basically, the invention comprises the formation of a continuous high temperature, flue gas mantle over an area by passing gases through a porous layer for combustion over the area, and then inserting into the mantle the material to be heated.

The invention especially comprises a method of rapidly heating a material, such as a fusible substance like plastic or wax, comprising the steps of providing a mixture of pressurized combustible gases, passing the gases in a finely dispersed form through a uniformly porous refractory material, preferably fibrous, with a sufficient pressure to cause the gases to emerge uniformly over the surface of said material with a substantial velocity, combusting the gases at or near the surface and forming a continuous mantle of flameless high temperature flue gases of substantial thickness over the surface of the refractory material, and passing a material to be heated through the confines of said continuous mantle to rapidly heat the material without exposure to oxygen in the air. In many instances it is desirable not only to provide the flameless mantle of gases, but also to eliminate infrared heat by compressing the fibrous refractory layer slightly unitil the infrared heat disappears.

Referring now to the drawings, to practice the novel method, a burner 10 is utilized. It includes housing 12, and combustible gaseous mixture supply line 14 having a suitable valve 18 to introduce into the housing a combustible gas such as a hydrocarbon gas and an oxygen containing gas, e.g. compressed air. The pre-mixed gases are supplied to pressure chamber 20 in the lower portion of the housing 12. They pass in a uniformly dispersed manner through integral layer 24 of fibrous refractory material 24. It is preferably formed of fibers of alumina and silica many times smaller than a human hair (preferably about 3½ microns in diameter) and is uniform in texture and porosity. The fibers are bonded with a small amount of bonding material sufficiently to provide fiber stability and self-supporting body to the layer. The bonding agent may be organic or ceramic, providing it does not flow when heated to plug the tiny interstices in the layer. A typical material is up to 3% of a phenolic resin such as phenol formaldehyde. This layer may range in thickness, for example, from 1/16 inch to about 2 inches or more, as desired, depending upon the particular use, as long as porosity, density, and thickness are uniform throughout the layer.

The fibers may be formed from molten alumina and silica by a steam blast. They are randomly dispersed in a layer, preferably in a 50–50 ratio, and provided with a binder. The layer is then compressed to the desired thickness and density. It is baked to cure the binder. A typical density for a gaseous pressure of ½ inch to 10 inches of water, and a thickness of ½ inch is about 3 lbs./cu. ft. This may be greatly varied depending upon the use of the heating process, and the thickness of the flue gas mantle desired. A material found especially useful is that marketed by the Johns-Manville Company of Manville, N.J., under the trademark Cerafelt.

Figure 2:
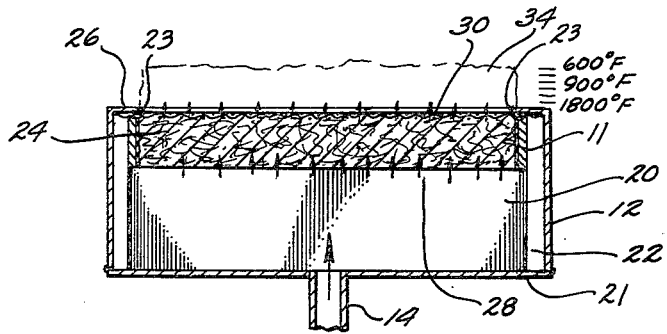
FIG. 2 is a sectional view of the apparatus illustrated in FIG. 1.
Figure 4:
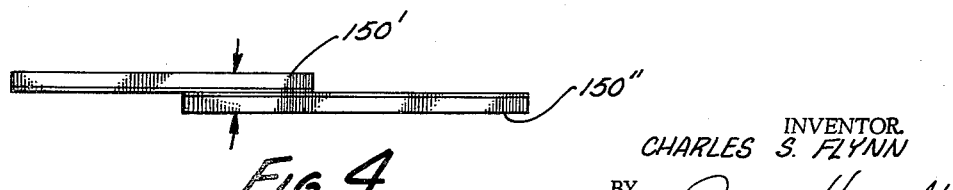
FIG. 4 is a side elevational view of one step in a typical use of the novel method of this invention.

The burner illustrated in FIGS. 1, 2 and 4 comprising one form capable of performing the heating process may be constructed as follows. The housing 12 shell has an open bottom and an opening in the top encompassed by a peripheral retaining flange 26. The fibrous layer 24 preferably is substantially coextensive with the opening. Before inserting the fibrous layer in housing shell 12, the layer is first thoroughly sealed within a peripheral wall 11 by a sealant-adhesive layer 13. This may be any suitable high temperature adhesive, but is preferably a substance having a base of the same material as the fibrous layer. Thus, ground-up silica and alumina fibers suspended in a suitable vehicle, usually inorganic, and given adhering and sealing qualities has been found to work well. Such a material is marketed under the trademark Cerakote, by Johns-Manville of Manville, N.J. The fibrous layer is made to protrude slightly upwardly from the shell as shown in exaggerated form in FIG. 5.

The enclosing wall 11 is smaller in diameter than the walls of shell 12, usually, since it is just slightly larger than the top opening. Therefore a set of spacers, e.g., 15 and 22 are attached as by welding to all four sides of the peripheral rim 11 to locate it in the shell 12. These spacers also act as compressors of the fibrous layer in a manner to be explained.

Screen 30 has a diameter substantially overlapping the top opening and usually extending to the walls of the housing. This screen serves to compress the fibrous layer since the upper edge of wall 11 is pressed into contact with the screen and flange 26 when inserted into the housing. The bottom 21 of the housing is secured by welding to the housing to hold the material compressed by contact with the bottom of the spacers, see, e.g., 22.

To obtain a uniform gas flow without leakage around the edges, it is important to apply a sealant 23 around the periphery of the top opening (FIG. 2) to seal between the wall 11 and flange 26. This sealant must be a high temperature material such as a conventional metallic sealant. It has been found that a colloidal copper suspension works well for this since it seals well and withstands very high temperatures. Such a material is marketed under the trademark Fel-pro C5A by Felt Products Manufacturing Company of Skokie, Ill.

Figure 3:
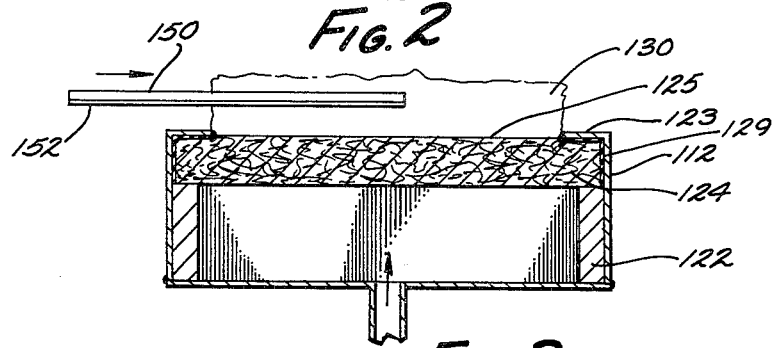
FIG. 3 is a sectional view showing a slight modification of the burner in FIG. 1 and heating a material.

In FIG. 3, an alternate structure is shown in which the integral fibrous layer 124 overlaps the top opening in housing 112 to fit snugly against the peripheral flange 123. An annular spacer 122 holds the layer in position. The layer is sealed around its peripheral edge and along the top edge by a layer 129 of sealant such as the Cerakote described above.

It has been found with this type of burner and process, that by varying the compression of the fibrous refractory layer as it is installed in the housing, the amount of infrared heat on the surface of the burner during operation may be controlled between a maximum and a state whereinall of the infrared heat is eliminated. In fact, the burner, when operating at a temperature of up to two thousand degrees F., actually appears dark on its hot surface. Only by looking across the surface can an extremely thin layer of blue flame be detected.

According to the method of this invention, after the alumina and silica fibers are integrated and compressed into the form of a bonded felt of the desired thickness, size, density, and configuration, it is placed in a burner to define a pressure chamber therebeneath. In operation, no matter what the dimensions of the burner or what the configuration thereof it has been found that the uniformly porous material with its myriads of surface orifices comprising interstices between the fibers has sufficient resistance to gaseous flow to cause the gases introduced in the chamber 20 to be distributed uniformly over the felt area without the need of baffles, and thus to be uniformly passed therethrough in the form of myriads of minute adjacent streamlets. The velocity of the exit gases is substantial. A gaseous pressure above one-half inch of water has been found to be satisfactory for a felt ½ inch thick and having a density of about 3 lbs./cu. ft. to achieve uniform burning. This pressure may be greatly varied, e.g., up to about 10 inches of water or more depending upon the desired heat output, temperatures, and flue gas mantle thickness (to be described hereinafter). This pressure, along with the porosity and thickness of the layer determines the velocity of the gases emerging from the outer surface of the burner. With the porous fibrous, refractory felt, combustion of the gases occurs just prior to emergence from or at the outer surface of the layer depending on whether the outer layer of fibers are compressed. When combustion takes place prior to emergence an intense infrared heat is emitted. If the outer fibers are compressed, an almost colorless, extremely thin flame results on the surface, with the infrared flame being partially or totally removed, depending upon the amount of compression of the layer.

It should be noted that any pin holes of a diameter larger than the micron range openings of the surface should be carefully plugged since such "pin-holes" create the emergence of flamelets which may extend a substantial distance from the surface, to thereby prevent uniform heating and also to forestall positioning of a combustible substance within a fraction of an inch from the burner as described hereinafter. The combustion or flue gases emerge with a sufficient velocity and in an overlapping fashion to cause a mantle 34 of air-excluding, continuous, high temperature flue gases over the entire surface area. This mantle is free from outside air and generally ranges in temperature over the thickness thereof as illustrated in FIG. 2. The thickness of this mantle may be controlled by the pressure of the gases, the thickness of layer 24 and the porosity of the layer to obtain a mantle anywhere from one-eighth to about one inch thick. In the novel method this unique thick continuous, protective, high temperature mantle is utilized to rapidly heat a material.

For example, as illustrated in FIG. 3, the mantle 130 may be used to envelop a laminate 150 of a backing (e.g., cardboard or paperboard) having a fusible layer 152 such as wax or plastic (e.g., polyethylene) to be "activated" or softened. The closeness of the material to the outer surface 125 of fibrous layer 124 determines the temperature to which it is subjected. There is no flame to attack the paper or plastic and it is protected completely from oxidation by the continuous mantle. It has been found with repeated experiments that coatings such as polyethylene on cardboard containers can be "activated" in time intervals of one-tenth of a second and less to enable them to be properly heat sealed by pressure techniques. For example in FIG. 4, two laminates 150' and 150" are sealed together by suitable pressure. It has been demonstrated repeatedly that with carton sealing machines utilizing the novel method, cartons may be sealed at rates of one hundred and eighty per minute and greater with no scorching, with proper heat sealing, and with no apparent loss of coating material by oxidation etc. This is a sharp contrast to prior methods wherein forty cartons per minute was considered excellent, even when losing half of the coating layer and when sacrificing a considerable percentage of the cartons due to scorching and poor sealing.

It should be noted that since there is no appreciable flame on the surface and since the mantle extends up to approximately one inch away from the surface, the cardboard materials or other combustible materials may be placed directly in the mantle with much less danger of fire. Further, if desired, it has been found that all infrared heat may be eliminated from the surface of the fibrous refractory layer by compressing the layer a proper amount to slowly cut down the infrared heat until it finally disappears, even though the temperature of the gases remains 600° to 1800° F. The amount of compression required for this varies with the thickness of the fibrous material, the gaseous pressure, the type of gas burned, the density and porosity of the fibrous material, and the diameter of the fibers. This is well within the skill of anyone in the art to gradually compress the material the desired amount as between suitable screens to obtain the results desired. It should be noted that the refractory material utilized to form the integral felt layer must be capable of withstanding temperatures of several hundred degrees and preferably of up to two thousand degrees F. It further must be an excellent insulation material, to insulate against any coincidence of heat backwardly through the layer.

The resulting heat is very intense due to complete combustion, absence of loss in light energy, lack of appreciable conductance loss, and the closely controlled boundaries of the heating area. This enables machine parts to be placed very close to the heated area without significant temperature increase therein. Also, portion of an article to be treated that would be damaged by heat can come very close to the hot area without significant temperature increase.

This process may be used for many types of materials and treatments. For example, the hot area may be made to conform to unusual surfaces such as that of shell molds to cure the binder resin therein, may be used to preheat surfaces of metal articles to be welded, may be used to dry coatings such as paint, or for many other purposes as is quite obvious.

Certain modifications within the principles taught may occur to those in the art upon studying the foregoing specification. Such modifications are deemed part of this invention, which is to be limited only by the scope of the appended claims and the reasonable equivalents thereto.

I claim:

1. A method of rapidly heating material in a completely protective atmosphere comprising the steps of: providing an integral, compressible layer of fibrous refractory material interengaged and compressed to form myriads of minute passages, said layer being compressed uniformly, and sufficiently to prevent any combustion beneath said surface in said layer to cause infrared glow when a combustible gaseous mixture is forced therethrough and combusted, the fibers on the surface of said layer being pressed flat against said surface with a fine mesh screen to prevent extension of individual fibers and glowing thereof; forcing a mixture of pressurized combustible gas and air through said layer; continuously combusting said mixture after emergence thereof from the surface of said layer and forming a continuous, substantially thick mantle of high temperature, air-excluding flue gases over the entire surface of said layer, while maintaining said surface blue and completely free of glow and radiant heat; and inserting the material to be heated into said mantle closely adjacent said surface for a short interval of time.

2. A method of rapidly activating a heat responsive material on a paper base in a completely protective atmosphere comprising the steps of: providing an integral, compressible layer of fibrous refractory material interengaged and compressed to form myriads of minute passages, said layer being compressed uniformly, and sufficiently to prevent any combustion beneath said surface in said layer to cause infrared glow when a combustible gaseous mixture is forced therethrough and combusted, the fibers on the surface of said layer being pressed flat against said surface with a fine mesh screen to prevent extension of individual fibers and glowing thereof; forcing a mixture of pressurized combustible gas and air through said layer; continuously combusting said mixture after emergence thereof from the surface of said layer; forming a continuous, substantially thick mantle of high temperature, air-excluding flue gases over the entire surface of said layer, while maintaining said surface blue and completely free of glow and radiant heat; and inserting the material on the paper base to be heated into said mantle closely adjacent said surface for a short interval of time.

References Cited by the Examiner

UNITED STATES PATENTS

| | | | |
|---|---|---|---|
| 1,238,011 | 8/17 | Ellis | 158—99 |
| 1,331,022 | 2/20 | Mathy | 158—99 |
| 1,830,826 | 11/31 | Cox | 158—99 |
| 2,362,972 | 11/44 | Brownback | 158—99 |
| 2,423,237 | 7/47 | Haslacker | 156—497 XR |
| 2,528,738 | 11/50 | Calkins et al. | 158—99 |
| 2,552,845 | 5/51 | Crosby | 158—99 |
| 2,786,511 | 3/57 | Reid | 156—497 XR |
| 3,027,936 | 4/62 | Lamp | 158—99 |
| 3,057,400 | 10/62 | Wagner | 158—99 XR |

FOREIGN PATENTS 2,100  1900  Great Britain.

EARL M. BERGERT, *Primary Examiner.*

DOUGLAS J. DRUMMOND, ALEXANDER WYMANN, *Examiners.*